(12) United States Patent
Fong

(10) Patent No.: US 8,031,652 B2
(45) Date of Patent: Oct. 4, 2011

(54) LOAD BALANCING FOR AN AIR INTERFACE PROTOCOL ARCHITECTURE WITH A PLURALITY OF HETEROGENOUS PHYSICAL LAYER MODES

(75) Inventor: Mo-han Fong, L'original (CA)

(73) Assignee: Nortel Networks Limited, St. Laurent (CA)

( * ) Notice: Subject to any disclaimer, the term of this patent is extended or adjusted under 35 U.S.C. 154(b) by 851 days.

(21) Appl. No.: 12/066,096

(22) PCT Filed: Sep. 8, 2006

(86) PCT No.: PCT/CA2006/001480
§ 371 (c)(1),
(2), (4) Date: Mar. 7, 2008

(87) PCT Pub. No.: WO2007/028252
PCT Pub. Date: Mar. 15, 2007

(65) Prior Publication Data
US 2008/0273493 A1 Nov. 6, 2008

Related U.S. Application Data

(60) Provisional application No. 60/715,281, filed on Sep. 8, 2005, provisional application No. 60/751,848, filed on Dec. 20, 2005, provisional application No. 60/804,343, filed on Jun. 9, 2006.

(51) Int. Cl.
*H04B 7/212* (2006.01)
*H04B 7/208* (2006.01)
*H04W 4/00* (2009.01)
*H04J 3/00* (2006.01)

(52) U.S. Cl. ........ 370/322; 370/330; 370/337; 370/344; 370/348; 455/435.3

(58) Field of Classification Search ............... 370/330
See application file for complete search history.

(56) References Cited

U.S. PATENT DOCUMENTS

| | | | | |
|---|---|---|---|---|
| 5,276,686 A * | 1/1994 | Ito | ................................ | 370/330 |
| 6,160,801 A * | 12/2000 | Uchida et al. | ................. | 370/337 |
| 6,502,594 B1 * | 1/2003 | Gerstmar | .................... | 135/120.1 |
| 6,519,240 B1 * | 2/2003 | Dillinger et al. | ............. | 370/337 |
| 6,996,075 B2 * | 2/2006 | Santhoff et al. | ............... | 370/310 |
| 7,133,380 B1 * | 11/2006 | Winters et al. | ................ | 370/329 |
| 2002/0067736 A1 * | 6/2002 | Garcia-Luna-Aceves et al. | ............................. | 370/442 |
| 2002/0085531 A1 * | 7/2002 | Herrmann et al. | ............ | 370/338 |
| 2005/0135308 A1 * | 6/2005 | Vijayan et al. | ................ | 370/330 |
| 2006/0126552 A1 * | 6/2006 | Lee et al. | ...................... | 370/321 |

FOREIGN PATENT DOCUMENTS

WO   WO 03073708 A1 *   9/2003
WO   WO 2004004245 A1 *   1/2004

* cited by examiner

*Primary Examiner* — Andrew Chriss
(74) *Attorney, Agent, or Firm* — Garlick Harrison & Markison; Kevin L. Smith

(57) ABSTRACT

A system and method for dynamic traffic load balancing with a multiple physical layer modes of an air interface protocol architecture, the protocol architecture residing in a base station and/or an access network that includes a base station and access gateway that include distributed and centralized components of the air interface protocol architecture. The traffic load balancing supports various multiplexing scenarios for scheduling communication data under time division multiple access and frequency division multiple access techniques for use in the multi-carrier wireless network.

10 Claims, 10 Drawing Sheets

LOAD BALANCING FOR AN AIR INTERFACE PROTOCOL ARCHITECTURE WITH A PLURALITY OF HETEROGENOUS PHYSICAL LAYER MODES

CROSS-REFERENCE TO RELATED APPLICATIONS

The present application claims priority pursuant to 35 USC §119(e) to U.S. Provisional Application Ser. No. 60/715,281, filed Sep. 8, 2005, expired, to U.S. Provisional Application Ser. No. 60/751,848, filed Dec. 20, 2005, expired, and to U.S. Provisional Application Ser. No. 60/804,343, filed Jun. 9, 2006, expired, each of which is hereby incorporated by reference herein in their entirety.

BACKGROUND

1. Technical Field

The present invention relates generally to cellular wireless networks, and more particularly to the loading of multiple physical layer modes to service a cellular wireless network.

2. Related Art

Wireless networks re known. Cellular wireless networks support wireless communication services in many populated areas of the world. While wireless networks were initially constructed to service voice circuit-switched voice communications, they are now called upon to support packet-switched data communications as well.

The transmission of packetized data communications within a wireless network places different demands on networks than does the transmission of voice communications. Voice communications require a sustained bandwidth with minimum signal-to-noise ratio (SNR) and continuity requirements. Data communications, on the other hand, typically are latency tolerant but have higher total throughput requirements. Conventional circuit-switched wireless networks were designed to support the well-known voice communication requirements. Thus, wireless networks (as well as conventional circuit switched telephone networks) have been adapted to service data communications, with such adaptation providing mixed results.

As the variety of devices that support wireless communications both on a circuit-switched basis and on a packet-switched basis are increasing, as well as devices having multiple modes of operation to support voice and multimedia communications. With respect to the infrastructure to support these devices, the ability to service all manners of circuit and packet communications exist while sustaining the Quality of Service, and complying with the Service Level Agreements despite the load placed upon components of the network infrastructure.

Thus, there exists a need for traffic load balancing of multiple physical layer modes of an air interface protocol architecture to accommodate the varying single-mode and multi-mode mobile terminals that may be present within a wireless communications system.

SUMMARY OF THE INVENTION

To overcome these shortcomings, among others, by providing dynamic traffic load balancing with a multiple physical layer modes of an air interface protocol architecture residing in a base station and/or an access network that includes a base station and access gateway that include distributed and centralized components of the air interface protocol architecture.

According to an embodiment of the invention, the traffic load balancing supports various multiplexing scenarios for scheduling communication data of a time slot of multiple time slots for use in the multi-carrier wireless network. This operation includes, for each time slot of the multiple time slots for transmitting the data, to assign priorities to each mobile terminal coupled to the base station based upon a scheduling priority criteria. Each of the mobile terminals include at least one physical layer mode. The mobile terminals are sorted in order of their assigned priority for data communications.

When the physical layer mode multiplexing scenario is a Time Division Multiplexing (TDM) scenario, the physical layer mode is selected based upon the mobile terminal having the highest assigned priority for data communications and the physical layer mode that it supports. If the time slot can accommodate an additional mobile terminal, the next highest assigned priority mobile terminal, which supports the selected physical layer mode, is selected. This operation continues until the time slot cannot accommodate further mobile terminals, or no further mobile terminals are available for data communications.

When the physical layer mode multiplexing scenario is a Frequency Division Multiplexing (FDM) scenario, the physical layer mode is selected based upon the highest assigned priority mobile terminal for data communication and whether the highest assigned priority mobile terminal is a single physical-layer mode mobile terminal or a multi physical-layer mode mobile terminal.

When physical layer resources can accommodate an additional mobile terminal, a next highest assigned priority terminal is selected for data communication. The process continues until the physical layer resources cannot accommodate an additional mobile terminal or no additional mobile terminals remain.

With respect to the FDM scenario, when the highest assigned priority mobile terminal is a physical layer multi-mode terminal, and the multi-mode mobile terminal is not capable of data communications with each of the plurality of physical layer modes of interest, the selected physical layer mode is a least loaded physical layer mode. When the multi-mode terminal is capable of data communications with each of the plurality of physical layer modes of interest, the selected physical layer mode is the physical layer mode that occupies a least amount of spectrum resources.

In a further aspect, when the selected physical layer mode changes to a subsequent selected physical layer mode, the set of MAC states supported by the subsequent physical layer mode is determined. When a present MAC state of the mobile terminal is not supported by the new set of MAC states, the mobile terminal switches to a valid MAC state for the selected physical layer mode.

In yet a further aspect, an access network for a multi-carrier wireless communications network to simplify context transfer in a handoff of a mobile terminal. The access network includes an access gateway and a plurality of base stations anchored to the access gateway. The access gateway is coupled to a wireless core network infrastructure, where the access gateway includes a centralized layer 2/3 protocol structure. Each of the base stations provide a coverage area for data communications with the mobile terminal, wherein each base station includes a distributed layer 2/3 protocol structure. The access gateway stores a centralized layer 2/3 context of the mobile terminal. By storing a centralized layer 2/3 context of the mobile terminal, context transfers are not necessary for an intra-base station handoff between the base stations.

Other aspects and features of the present invention will become apparent to those ordinarily skilled in the art upon review of the following description of specific embodiments of the invention in conjunction with the accompanying figures.

DETAILED DESCRIPTION OF THE DRAWINGS

Figure 1:
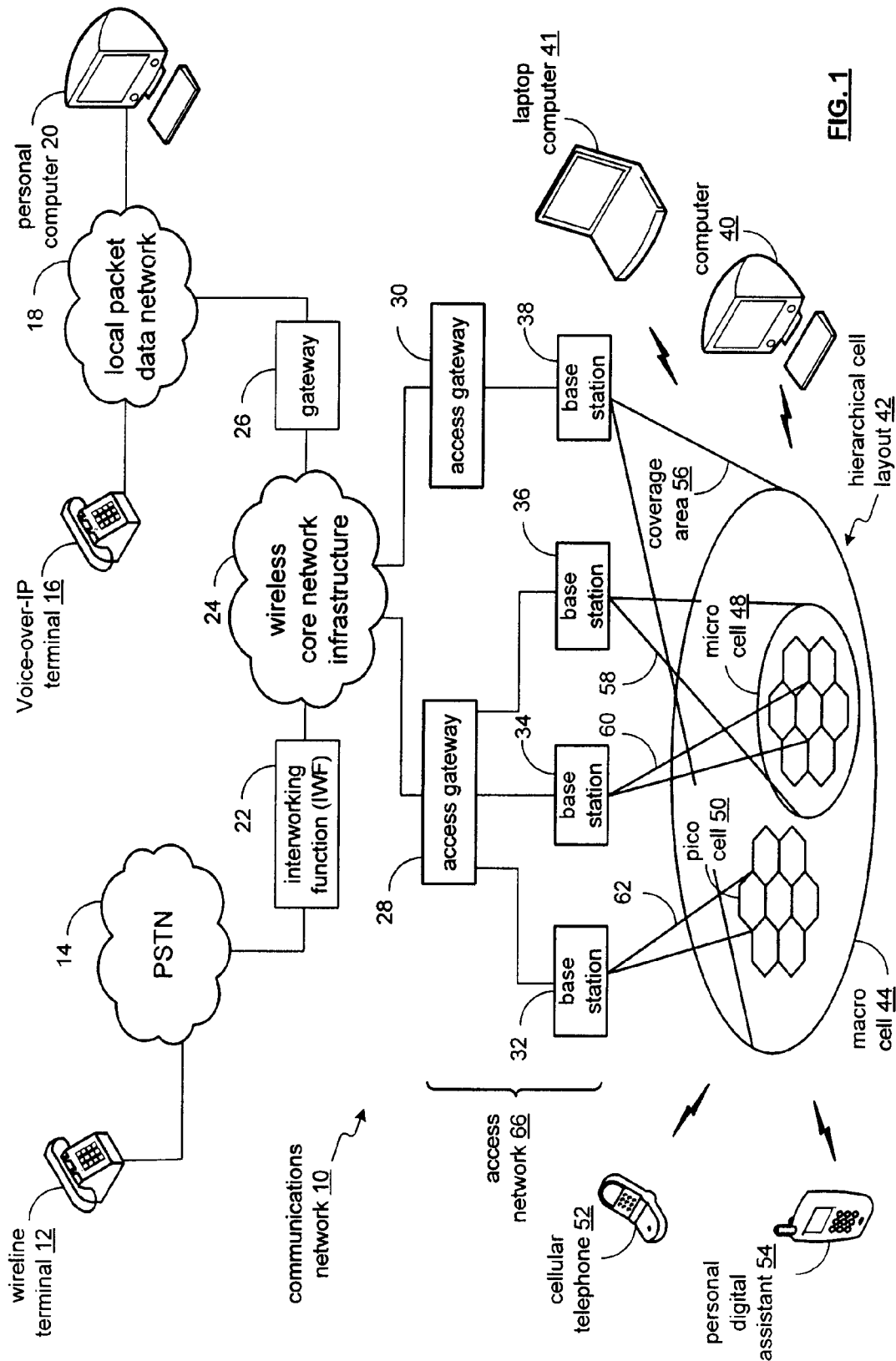
FIG. 1 is a system diagram illustrating a portion of a communications network constructed in accordance with an embodiment of the present invention.

FIG. 1 is a system diagram illustrating a portion of a communications network 10 constructed according to an embodiment of the present invention. The communications network 10 includes a wireless core network infrastructure 24, access gateway 28 and access gateway 30. The wireless core network infrastructure operates according to an operating standards specification that may have been modified according to the embodiment of the present invention (for example, High Speed Downlink Packet Access (HSPDA), 1xEV, et cetera). The wireless core network infrastructure 24 couples to a local packet data network 18 and also to the Public Switched Telephone Network (PSTN) 14. The wireless core network infrastructure may be provided as a packet-switched infrastructure, which couples to the local packet data network via a gateway 27, and couples to the PSTN 14 via an interworking function (IWF) 22.

A conventional wireline terminal 12 couples to the PSTN 14. A Voice-over-IP (VoIP) terminal 16 and a personal computer 20 couple to the local packet data network 18. Mobile terminals 40, 41, 52, and 54 wirelessly couple to the communications network 10 via wireless links with the base stations 32, 34, 36, and 38, which provide wireless coverage via a hierarchical cell layout 42. As illustrated, mobile terminals may include a cellular telephone 52, a data terminal 54 (for example, a personal digital assistant), a laptop computer 41, and a desktop computer 40. The wireless network, however, supports communications with other types of mobile stations as well.

Each of the base stations 32, 34, 36, and 38 has associated coverage areas 62, 60, 58, and 56, respectively, that services a cell/set of sectors. The coverage by the base stations 32, 34, 36, and 38 provides a hierarchical cell layout 42, which includes a combined coverage of both macrocells, microcells, and picocells, such as the macrocell 44, the microcell 48, and picocell 50.

An access network 66 to the hierarchical cell layout 42 includes the access gateway 28 and the access gateway 30, and the base stations 32, 34, 36, and 38. Wireless communication between the mobile terminals and the access network 66 occur via a protocol stack that includes a common layer 2/3 protocol structure and a multi-mode physical layer. The multi-mode physical layer includes a plurality of heterogeneous physical layer modes to support a variety of physical layer configurations of the various mobile terminals.

The common layer 2/3 protocol functionality may be partitioned between an access gateway and the base stations, but may also reside wholly in a base station. In this regard, the base stations 32, 34, 36, and 38 include a multi-mode physical layer and a "distributed" common layer 2/3 function. Each of the base stations may support multiple physical layer modes in the same coverage area 56, 59, 60, and 62. The access gateways 28 and 30 provide a "centralized" component of the layer 2/3 function, and also serve as a router within the access network 66 and provide interface to the wireless core network infrastructure 24 (as well as public IP networks).

The centralized component of the layer 2/3 increases the efficiency by simplifying or removing the transfer of contexts in handoff operations. That is, each of the base stations 32, 34, 36, and 38 belong to different cell hierarchies, which may be anchored by the same access gateway or different access gateways. When handoffs occur between the base stations 32, 34, and/or 36 that are anchored by the same access gateway 28, the centralized layer 2/3 context of the mobile terminal is contained within the access gateway 28, thus eliminating a need to carry out a context transfer with the handoff. The distributed layer 2/3 context of the mobile terminal contained within the previous serving base station (such as base station 32) may be transferred to the target base station (such as base station 60), through the access gateway 28 or through a base station-to-base station link. As a result of having a centralized and a distributed common layer 2/3 protocol structure, a loss of layer 2/3 context information during handoff can be avoided, thus avoiding unnecessary packet loss and latency.

When there are handoffs between base stations anchored by different access gateways 28 and 30, the layer 2/3 context information relating to a mobile terminal may be transferred from the previous serving access gateway/base station to the target access gateway/base station through links between the devices.

The wireless links include both forward link components and reverse link components support wireless communications between the base stations and their serviced mobile terminals. These wireless links support both data communications and multimedia communications, such as VoIP. The teachings of the present invention may be applied equally to any type of packetized communication.

The common layer 2/3 protocol structure and the multi-mode physical layer provide Beyond 3G (B3G) services that support user terminals having a single physical layer mode (such as legacy user terminals) and those terminals having a multi physical layer mode terminal (such as recent terminals incorporating multimedia capabilities with increased data throughput requirements). In other words, the common layer 2/3 protocol stack may be provided by extending the existing 3G cellular protocol stacks to support backward compatibility for legacy user terminals. The protocol stack and common layer 2/3 protocol structure, and the multi-mode physical layer, are discussed in detail with reference to FIGS. 2 through 10.

Figure 2:
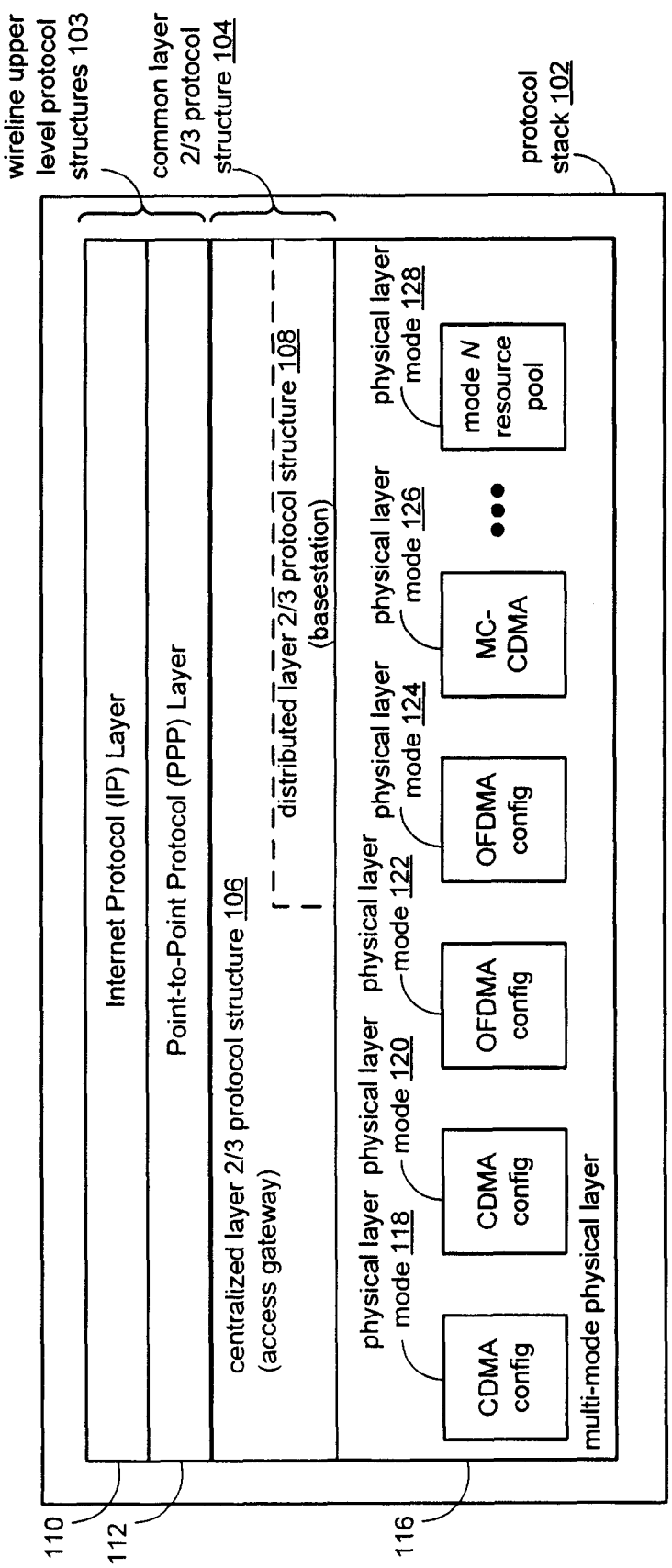
FIG. 2 illustrates a protocol stack for a high-speed multi-carrier wireless network in accordance with an embodiment of the present invention.

FIG. 2 illustrates a protocol stack 102 for a high-speed multi-carrier wireless network. The protocol stack includes wireline upper level protocol structures 103, a common layer 2/3 protocol structure 104, and a multi-mode physical layer 116. The common layer 2/3 protocol structure 104 includes a centralized layer 2/3 protocol structure 106, which may reside in an access gateway, and a distributed layer 2/3 protocol structure 108 that may reside in each of the base stations anchored by the access gateway. The multi-mode physical layer 116 includes a plurality of heterogeneous physical layer modes 118, 120, 122, 124, 126, and 128. Illustrated are centralized layer 2/3 305, distributed layer 2/3 307, and physical layer 309. The centralized layer 2/3 protocol structure 106 is included in an access gateway (for example, a base station controller), and the distributed layer 2/3 protocol structure 108 in the base station. The radio transceivers of the base stations include implement the multi-mode physical layer 116.

In the forward link, the physical layer in resource assignment to each mobile terminal is performed according to the radio channel condition experienced in the forward link of the mobile terminal, as well as service requirements which are defined by upper protocol layers, that is, the air-interface common layer 2/3 protocol structure 104. The layer 2 and 3 protocols provide a common interface with the wireline upper layer protocol structures 103 such as Point-to-Point Protocol (PPP) 112, Internet Protocol (IP) layer 301 110 and Transmission Control Protocol (TCP). The layer 2 and 3 protocols interface with the multi-mode physical layer 116 by selecting the appropriate physical layer resource in both frequency domain and time domain to meet the Quality of Service (QoS) required by upper layer applications as well as the subscriber profile for the mobile terminal. The invention is fully applicable to any multi-carrier protocol structure with a centralized layer 2/3 as described herein.

Consistent with the multi-carrier configuration of the communications network 10, the multi-mode physical layer 116 includes one to N carriers, each of which can be configured differently in terms of modulation and coding schemes. Each of the carriers can also be configured differently in terms of the QoS (or the set of QoS) the carrier provides to the wireline upper level protocol structures 103. The physical resource is divided into two domains: frequency domain in terms of carrier(s); and time domain in terms of time slots(s).

The next generation wireless systems, also referred to as Beyond Third Generation (B3G) wireless systems, include existing 2G/3G wireless access systems and emerging B3G wireless access systems, including, for example, fixed and mobile networks; pico-, micro- and macro-cellular networks; relay, mesh and ad hoc networks; broadcast/multicast and unicast networks. To support the wide variety of heterogeneous wireless access systems, the protocol stack 102 supports dynamic radio resources, and load and spectrum management across the various access systems via the multi-mode physical layer 116, to maximize the spectrum efficiency while meeting the Quality of Service (QoS) requirements of the user's applications and the user's Service Level Agreement (SLA). The spectrum allocation scenarios are discussed in detail with reference to FIG. 3.

Figure 3:
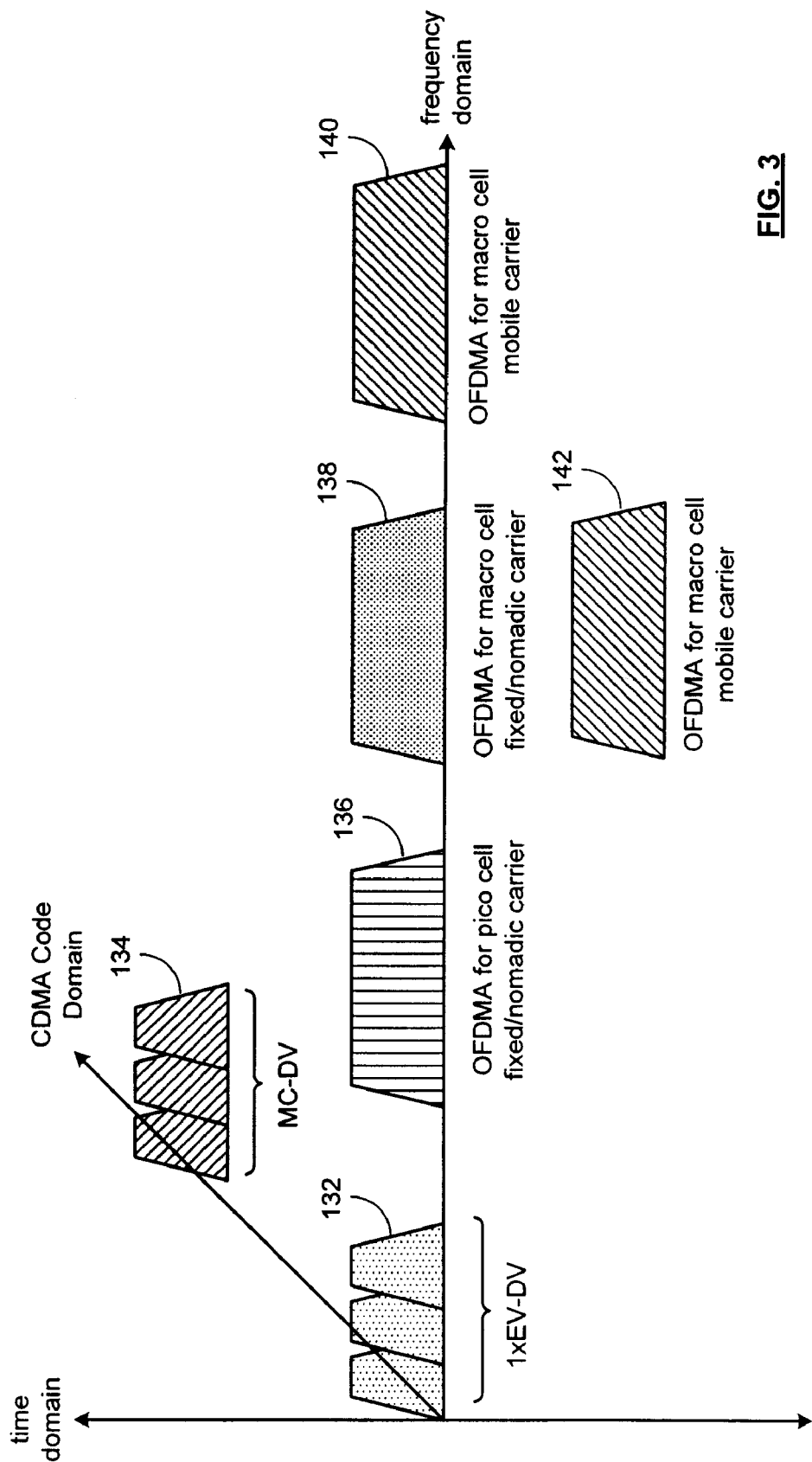
FIG. 3 illustrates the spectrum allocations scenarios with respect to a multimode physical layer resource sharing according to the time domain, frequency domain, and CDMA code domain.

FIG. 3 illustrates the spectrum allocations scenarios with respect to a multimode physical layer 116 resource sharing according to the time domain, frequency domain, and CDMA code domain. With the given variety of existing 2G/3G wireless access systems and emerging B3G systems, the different physical layer modes 118 through 128 may overlap in frequency.

For data communications, spectrum sharing the various physical layer modes may be performed in Time Division Multiplex (TDM) fashion, or Code Division Multiplex (CDM) fashion. The TDM approach may be used when different physical layer modes overlap in spectrum, such as when the same spectrum is chosen for emerging B3G access systems so as to enable support for both existing 2G/3G mobile terminals and new advanced mobile terminals during the transitional period when the deployment migrates from one physical layer mode to another. Spectrum sharing may also occur to support different service types that require different physical layer modes (for example, broadcast services and unicast services that may have different requirements on physical layer performance (such as coverage, cyclic prefix length in OFDMA case)), or fixed services and mobile services that are optimized under the different physical layer configurations available from the multi-mode physical layer 116. Accordingly, CDM may be applied to Code Division Multiple Access (CDMA) based physical layer modes overlapping in spectrum. Frequency Division Multiplexing (FDM) may be used when different physical layer modes are assigned to non-overlapping frequency spectrums.

Accordingly, the 1xEV-DV carrier 132 and the MC-DV carrier 134 are overlaid in CDM fashion on the same spectrum. The 1xEV-DV carrier 132 and OFDMA (Orthogonal Frequency Division Multiple Access) with different configurations are overlaid in FDM fashion. The OFDMA mode with different configurations (for example, OFDMA for macro-cellular fixed/nomadic carrier 138 and OFDMA for mobile macro-cell carrier 140) are also be overlaid in TDM fashion.

A common signaling channel (physical and logical) may be shared by all the physical layer modes overlaid in the TDM fashion to allow mobile terminals to determine the physical layer mode used in a particular time slot.

Figure 4:
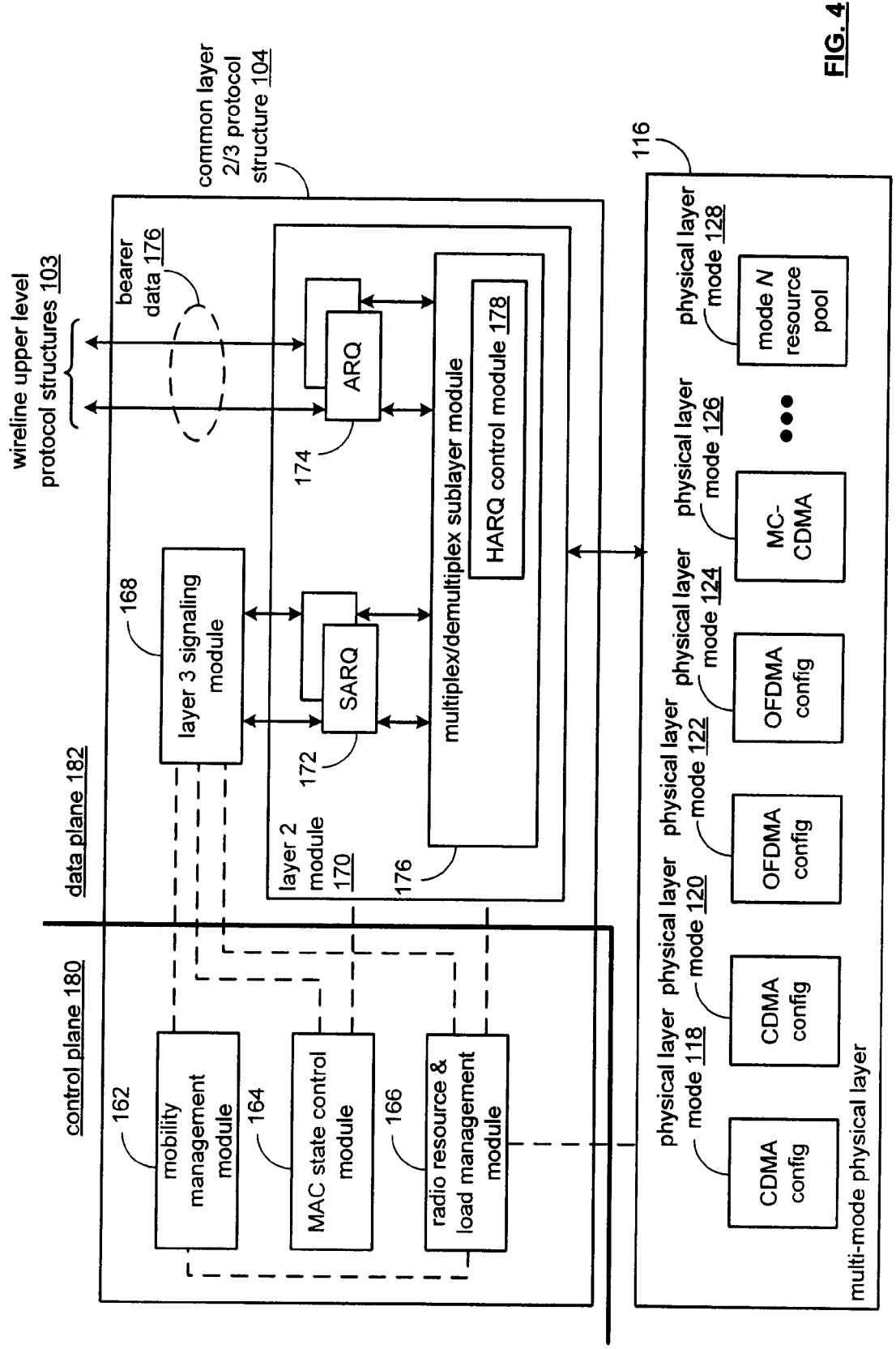
FIG. 4 is a block diagram illustrating a common layer 2/3 protocol structure anchoring a multi-mode physical layer with heterogeneous physical layer modes in accordance with an embodiment of the present invention.

FIG. 4 is a block diagram illustrating a common layer 2/3 protocol structure 104 anchoring a multi-mode physical layer 116 to provide, among other functions, mobility management, radio resource management, load control and/or spectrum management across the heterogeneous physical layer modes 118 through 128.

The control plane 180 of the common layer 2/3 protocol structure 104 includes a mobility management module 162, a MAC state control module 164, and a radio resource and load management module 166.

The data plane 182 of the common layer 2/3 protocol structure 104 includes a layer 3 signaling module 168 and a layer 2 module 170. The layer 2 module 170 includes a SARQ (Selective Automatic Repeat reQuest) 172, an ARQ (Automatic Repeat reQuest) 174, and a multiplex/demultiplex sublayer module 176 that also includes a HARQ (Hybrid ARQ) control module 178. The data plane 182 provides dynamic multiplexing and de-multiplexing of layer 2 frames from one or more mobile terminals to/from physical layer frames.

The multiplex/demultiplex sublayer module 176 of the data plane 182 may provide dynamic mapping of layer 2/3 data and signaling to/from the resource pools of the various physical layer modes 118 through 128. The physical layer modes 118 through 128 include a resource pool relating to the configuration of the physical layer mode 118. Each physical layer mode 188 is defined based on several parameters, which includes: the quality of service supported, a list of manageable resources, a carrier identification, and an air interface configuration (such as CDMA, OFDMA, MC-CDMA, et cetera).

The quality of service supported may include, but is not restricted to, data rate (minimum, maximum, and/or mean), packet loss rate, and service type such as real-time or delay tolerant service. The manageable resources are selected from among time slots, spreading codes, power, modulation and coding set, etc. The air-interface configuration may comprise IS-95, CDMA2000 1xRTT, CMDA2000 1xEV-DO, the evolution of CDMA2000 air interfaces, or other configuration types. One or more physical layer modes may reside on the same carrier. On the other hand, a resource pool may consist of multiple carriers.

Referring to the control plan 180, the mobility management module 162 provides handoff support while the radio resource and load management module 166 manages how the multi-mode physical layer resource pools are used and load control between the resource pools. The MAC (Medium Access Control) state control module 164 includes a MAC state machine of each mobile terminal and controls how the mobile terminal transitions from one MAC state to the other.

The mobility management module 162 supports inter-base station handoffs, intra-base station handoff between the physical layer modes 118 through 128, and inter-access gateway handoffs (such as between access gateway 28 and 30). The handoff may be initiated by a mobile terminal 40, 41, 52, and/or 54 or by the access network 66, which includes the access gateways 28 and 30, and base stations 32 through 38.

With respect to intra-base station handoffs, the handoffs may occur with physical layer modes having different frequency spectrums, and with physical layer modes sharing a frequency spectrum. In an intra-base station handoff between physical layer modes occupying different frequency spectrums, a handoff mechanism may be used. In an intra-base station handoff between physical layer modes sharing a frequency spectrum in either CDM fashion or TDM fashion, an explicit handoff mechanism may not be required if the mobile terminal has the capability to dynamically switch between the physical layer modes on a frame-by-frame basis based on the common signaling information from the base station. If the mobile terminal cannot dynamically switch between different physical layer modes, an explicit handoff mechanism may be used to 'handoff' the mobile terminal from one physical layer mode to another.

With handoffs, the respective layer 2/3 contexts relating to a mobile terminal are also transferred. For intra-BS handoff between physical layer modes 118 through 128, a layer 2/3 context transfer is not necessary when a centralized layer 2/3 protocol structure 106 resides in an access gateway. For inter-base station handoff, the context for the distributed layer 2/3 protocol structure 108 is transferred from the serving base station to the target base station. For inter-access gateway handoff, both the contexts for the distributed layer 2/3 protocol structure 108 and the centralized layer 2/3 protocol structure 106 are transferred from the serving base station/access gateway to the target base station/access gateway, accordingly.

The radio resource and load management module 166 performs resource allocations including: semi-static and/or dynamic resource allocation within a physical layer mode, semi-static and/or dynamic resource allocation across physical layer modes sharing the same spectrum, or semi-static and/or dynamic resource allocation and load balancing across physical layer modes belonging to different spectrum and different cell hierarchies. Under semi-static resource allocation, resources allocated to each physical layer mode changes slowly, on the order of hours based on large scale loading condition of the physical layer modes. Under dynamic resource allocation, resources allocated to each physical layer mode can change as frequent as a per-frame basis. For dynamic resource allocation, the use of a multi-mode mobile terminal is not required.

Under semi-static and/or dynamic resource allocation across physical layer modes sharing the same spectrum, the same spectrum may be shared by multiple physical layer modes in either CDM fashion or TDM fashion. The resource partition (that is, the code space partition for the CDM case, the time slot partition for the TDM case) between physical layer modes may be configured semi-statically based on the loading condition on each physical layer modes. The resource partition may also be dynamic on a frame-by-frame basis based on the real-time QoS requirements and buffer condition of the mobile terminal traffic in each of the physical layer modes 118 through 128. The frame-by-frame multiplexing and demultiplexing of the mobile terminal traffic to different physical layer modes may be performed at the multiplex/demultiplex sublayer module 176 based on the scheduling policy defined by the radio resource management and load management module 166.

Under semi-static and/or dynamic resource allocation and load balancing across the physical layer modes 118 through 128, each of the physical layer modes may belong to different spectrum and different cell hierarchies. Accordingly, the radio resource and load management module 166 serves to maximize the overall spectral efficiency across the physical layer modes according to a scheduling priority criteria based upon the QoS requirements of the mobile terminal's data traffic and/or mobility condition (that is, whether the mobile terminal is a user is a fixed, nomadic or mobile). In addition to load balancing, the radio resource management function makes handoff decisions based on the mobile terminal's location and channel condition with respect to the hierarchical cell layout 42 of the different physical layer modes 118 through 128. Load balancing is discussed in further detail with respect to FIGS. 5 and 6.

The MAC state control module 164 provides power saving capabilities with respect to each of the physical layer modes 118 through 128 and is also accessed during mobile terminal handoffs to from one physical layer mode to another so as to place the physical layer mode into a MAC appropriate state (that is, a state recognized by the characteristics of that physical layer mode.

For power saving purposes, the MAC state control module 164 provides different operational states, including an active state, a suspended state, a dormant state, and a power-saving state. Each of the mobile terminals coupled to the base station may be in different operational states, or accommodate some, but not all, of the states. For example, a 1xRTT or 1xEV-DV systems may operate on the active state, suspended state and dormant state. A 1xEV-DO system may operate on the idle state and the active state. As another example, an IEEE 802.16e system may operate in a suspended mode, dormant mode, and an active mode (such as in IEEE 802.16e systems).

Accordingly, a mobile terminal with multi-mode access may include an existing 3G 1xEV-DO physical layer mode, MC-DO (that is, Multi-Carrier DO, a short-term evolution of 1xEV-DO analogous to the MC-DV concept described in) physical layer mode, OFDMA overlay physical layer mode and OFDMA standalone physical layer mode.

On the forward link, the 1xEV-DO, MC-DO and OFDMA overlay modes may share the same frequency spectrum in TDM fashion. On the reverse link, the 1xEV-DO and MC-DO modes may share the same frequency spectrum in CDM fashion, while the OFDMA overlay mode may occupy a separate frequency spectrum to avoid any mutual interference between a CDMA waveform and an OFDMA waveform.

Alternatively, the OFDMA overlay mode may share the same spectrum as a 1xEV-DO/MC-DO at the expense of degraded overall system performance due to mutual interference. The OFDMA standalone mode may occupy separate frequency spectrums on the forward link and the reverse link. These physical layer modes may share a common layer 2/3 protocol structure 104 based on the existing 1xEV-DO layer 2/3 protocol structure.

Continuing with the example, the overlay of 1xEV-DO, MC-DO and OFDMA overlay modes onto the same spectrum supports a mixed of legacy 1xEV-DO terminals, MC-DO terminals, and OFDMA terminals while the deployment migrates towards broadband and OFDMA for a high-speed data service offering. The TDM pilot channel and MAC channel in the 1xEV-DO system may be shared by all three of the physical layer modes as common pilot and signaling channels for system acquisition and to carry information regarding the physical layer mode in use for a particular time slot, as well as the mobile terminal(s) scheduled on a particular time slot.

The physical layer mode and the mobile terminal(s) scheduled on each time slot can be dynamically changed based using fast TDM scheduling across the three physical layer modes. The fast TDM scheduling at the multiplex/demultiplex sub-layer module 176 dynamically maps the mobile terminals' data communications to different physical layer modes per scheduling priority criteria based on the QoS requirements of the data communications, the mobile terminals' SLA, the mobile terminals' channel conditions, and the physical layer modes supported by the user terminals.

As noted, a terminal may support one or multiple physical layer modes. To provide universal system access, a set of primary common channels (that is, paging, access and synchronization channels) are used by each of the physical layer modes 118 through 128 to allow mobile terminals supporting that support multiple physical layer modes to perform initial access to the system.

Each of the physical layer modes 118 through 128 designated as anchor carrier(s) within the spectrum may be defined to carry the primary common channels. In addition to the primary common channels used for initial system access, each physical layer mode may also use an additional set of supplemental common channels used by terminals that have already acquired and operate in the physical layer mode. The supplemental common channels may be used for MAC state transition from the a dormant MAC state or other intermediate states to the active MAC state. Unlike the primary common channels, the supplemental common channels may not reside in the anchor carrier. Dividing the common channels into primary set and a supplemental set allows dynamic resource provisioning of the supplemental set based on loading of each physical layer mode. The MAC state control module is discussed in further detail with respect to FIGS. 7 and 8.

Figure 5:
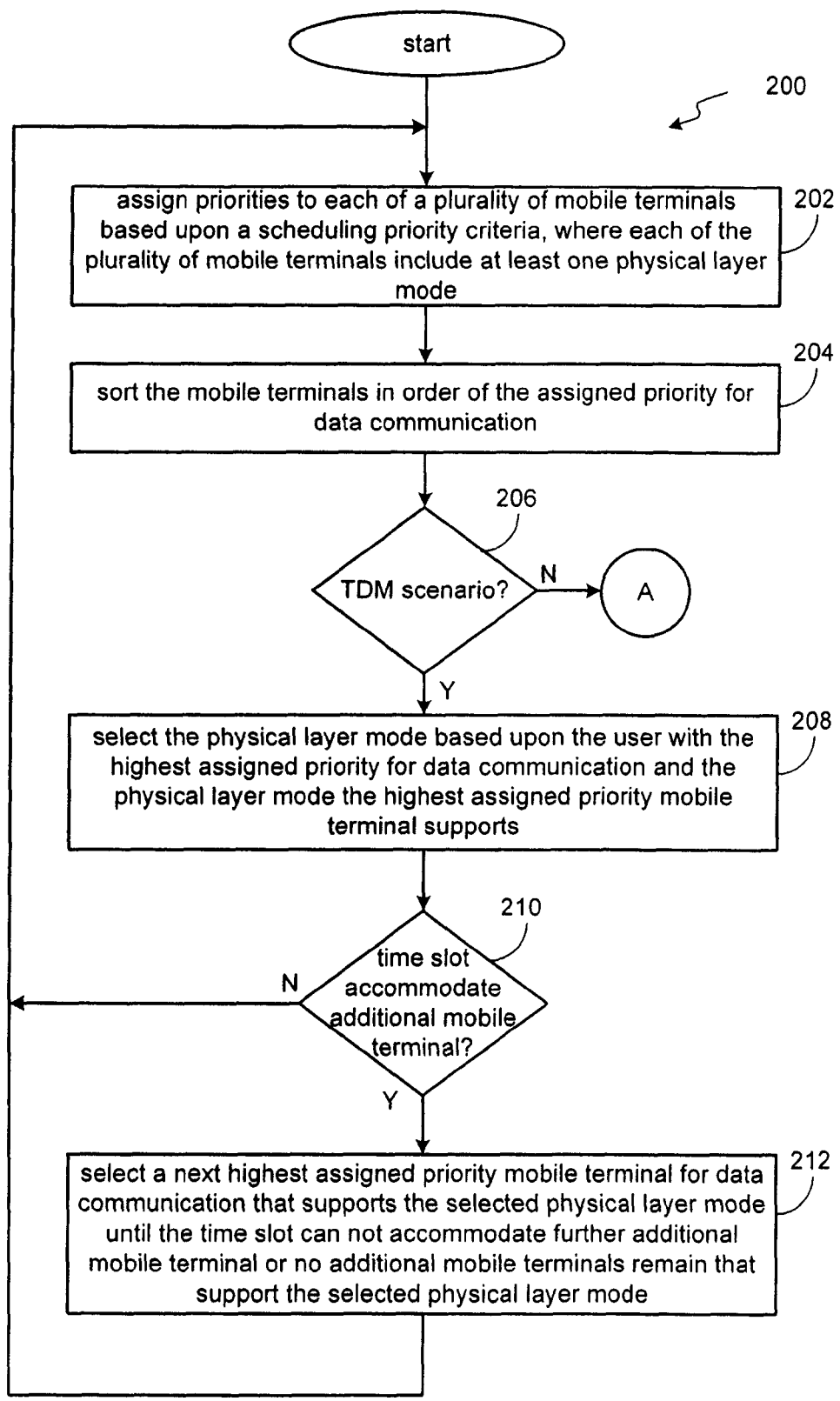
FIGS. 5 and 6 are a logic diagram illustrating dynamic traffic load balancing with a plurality of heterogeneous physical layer modes of an air interface protocol architecture in accordance with an embodiment of the present invention.
Figure 6:
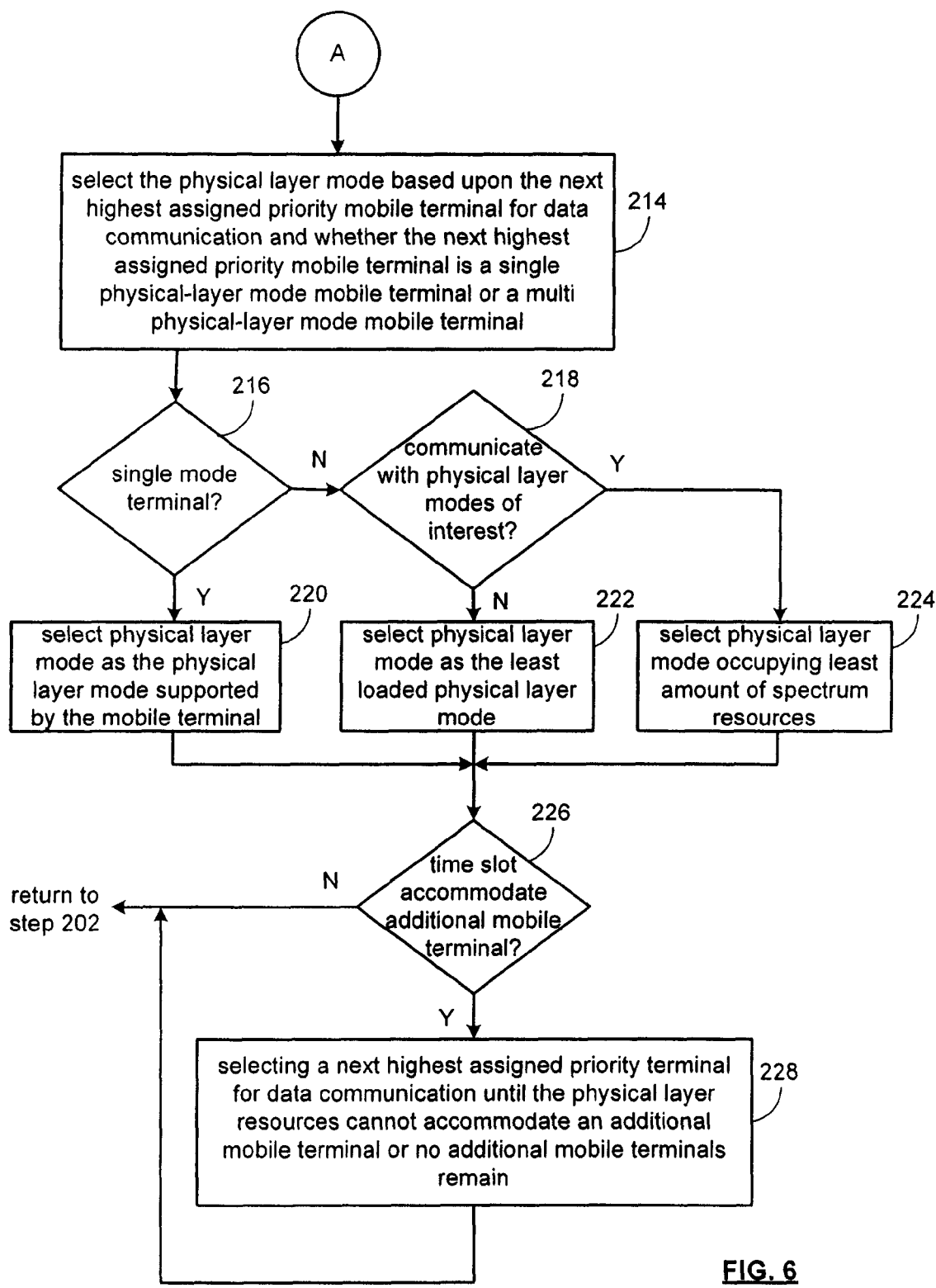

FIGS. 5 and 6 are a logic diagram 200 illustrating dynamic traffic load balancing with a plurality of heterogeneous physical layer modes of an air interface protocol architecture. The traffic load balancing serves to dynamically assign TDM and FDM resources to the heterogeneous physical layer modes on a time-slot basis for multiplexed communication of data communications to the multi-mode physical layer 116. In operation, load balancing and fast scheduling may be simultaneously performed across the heterogeneous physical layer modes, allowing per time-slot and per packet opportunistic scheduling and load balancing to maximize the system capacity while meeting scheduling priority criteria (such as QoS, SLA, et cetera).

For each time slot of the plurality of time slots, beginning at step 202, the base station or device deploying the protocol stack 102, assigns priorities to each of a plurality of mobile terminals based upon a scheduling priority criteria, where each of the plurality of mobile terminals include at least one physical layer mode. The criteria may be based on various elements, such as QoS, SLA, et cetera.

For example, when a TDM scenario is expected, such as when sharing the frequency spectrum between the physical layer modes, the scheduling priority criteria may include the instantaneous data rate supported by the mobile terminal at the time slot, the physical layer mode based on an instantaneous channel condition being experienced by the mobile terminal in the physical layer mode, the average data rate experienced by the mobile terminal up to the present time slot, the queuing delay experienced at the time slot (applicable to delay sensitive service), and the minimum guaranteed data rate for the mobile terminal based on the SLA.

The scheduler for the multiplex/demultiplex sublayer module 176 may compute the priority of all the mobile terminals' data packets in a buffer of the layer 2 module 170 for the corresponding physical layer modes supported by the mobile terminals. The set of physical layer modes supported by a user during an active call session may be configured during call setup based on the user terminal capability and the users requested service types and mobility conditions. Also, purposes of the scheduling priority criteria, which may be established under a priority equation or algorithm, a proportional fairness scheduler or a fairness plus delay scheduler may be used to optimize the overall system capacity across the physical layer modes for each of the mobile terminals' QoS and SLA requirements.

With the priorities assigned, the mobile terminals are sorted in order of the assigned priority for data communication at step 204. When the physical layer mode multiplexing scenario is a Time Division Multiplexing (TDM) scenario at step 206, then the base station selects the physical layer mode based upon the mobile terminal with the highest assigned priority for data communication and the physical layer mode that the highest assigned priority mobile terminal supports at step 208.

At step 210, when the time slot can accommodate an additional mobile terminal, at step 212 the base station selects a next highest assigned priority mobile terminal for data communication that supports the selected physical layer mode. The base station continues this process until the time slot can not accommodate additional mobile terminals or no additional mobile terminals remain that support the selected physical layer mode.

At step 206, when the multiplexing scenario is not a TDM scenario, the multiplexing scenario is a Frequency Division Multiplexing (FDM) scenario. In this instance, different physical layer modes occupy different non-overlapping frequency bands. Load balancing between the physical layer modes can be performed either dynamically or semi-statically.

With respect to dynamic load balancing under the FDM scenario, each physical layer mode may be dynamically changed each for each data packet or frame. In this manner, wideband receivers capable of receiving the radio frequency signal from the entire spectrum across the physical layer modes of interest can be used by the base station to service compatible multi-mode mobile terminals.

The dynamic spectrum load balancing between different OFDMA modes may be used for fixed users, medium speed users and high speed users, and for unicast and multicast services. The spectrum or OFDM sub-carriers in this case may be dynamically assigned to different OFDMA modes from one time slot to another. To facilitate efficient multiplexing of fixed and mobile users, a fixed Fast Fourier Transform size may be used, thus the same basic sub-carrier spacing for all OFDMA physical layer modes may be used (for example, physical layer mode 122 and physical layer mode 124 of FIG. 4). The basic sub-carrier spacing may be based on the requirement to support fixed users. For mobile users, null sub-carriers are introduced to increase the effective sub-carrier spacing to integer number of the basic sub-carrier spacing. Unicast and multicast services are TDM as well because unicast and multicast transmissions may require different cyclic prefix length, thus different OFDM symbol durations. The specific time slots used for multicast transmission may be broadcast through the common signal channels to all mobile terminals in the communications system 10.

Referring to FIG. 6, the base station selects, at step 214, the physical layer mode based upon the next highest assigned priority mobile terminal for data communication and whether the next highest assigned priority mobile terminal is a single physical-layer mode mobile terminal or a multi physical-layer mode mobile terminal. When at step 216, the mobile terminal is a single mode terminal, the physical layer mode selected is the physical layer mode supported by the mobile terminal. When at step 216, the mobile terminal is not a single mode terminal but a multi-mode terminal, a determination is made at step 218 as to whether the mobile terminal is able to communicate with the physical layer modes of interest. When not, the mobile station then selects the physical layer mode to be the least loaded physical layer mode at step 222.

When the mobile terminal is able to communicate with the physical layer modes of interest at step 218, then the base station selects the physical layer mode occupying the least amount of spectrum resources at step 224. At step 226, when the time slot can accommodate an additional mobile terminal, the base station at step 228 selects the next highest assigned priority terminal for data communication until the physical layer resources cannot accommodate an additional mobile terminal or no additional mobile terminals remain.

The method 200 returns to step 202 (see FIG. 5) when either the time slot cannot accommodate an additional mobile terminal at step 226, or the condition of no further physical layer resources are available or no additional mobile terminals remain in step 228.

An advantage of dynamic FDM load-balancing with respect to dynamic TDM load balancing is that the resource allocation to each physical layer mode is more flexible because there is no restriction to schedule mobile terminals with the same physical layer mode within each time slot. Frequency selective scheduling of the physical layer modes can be allocated for a particular sub-band based upon physical layer mode compatibility. For the case of frequency non-selective scheduling, compatibility other than the bandwidth granularity of the frequency division multiplexing (for example, 1.25 MHz for the case of FDM between 1xEV-DO/MC-DO and OFDMA) need not be considered.

Figure 7:
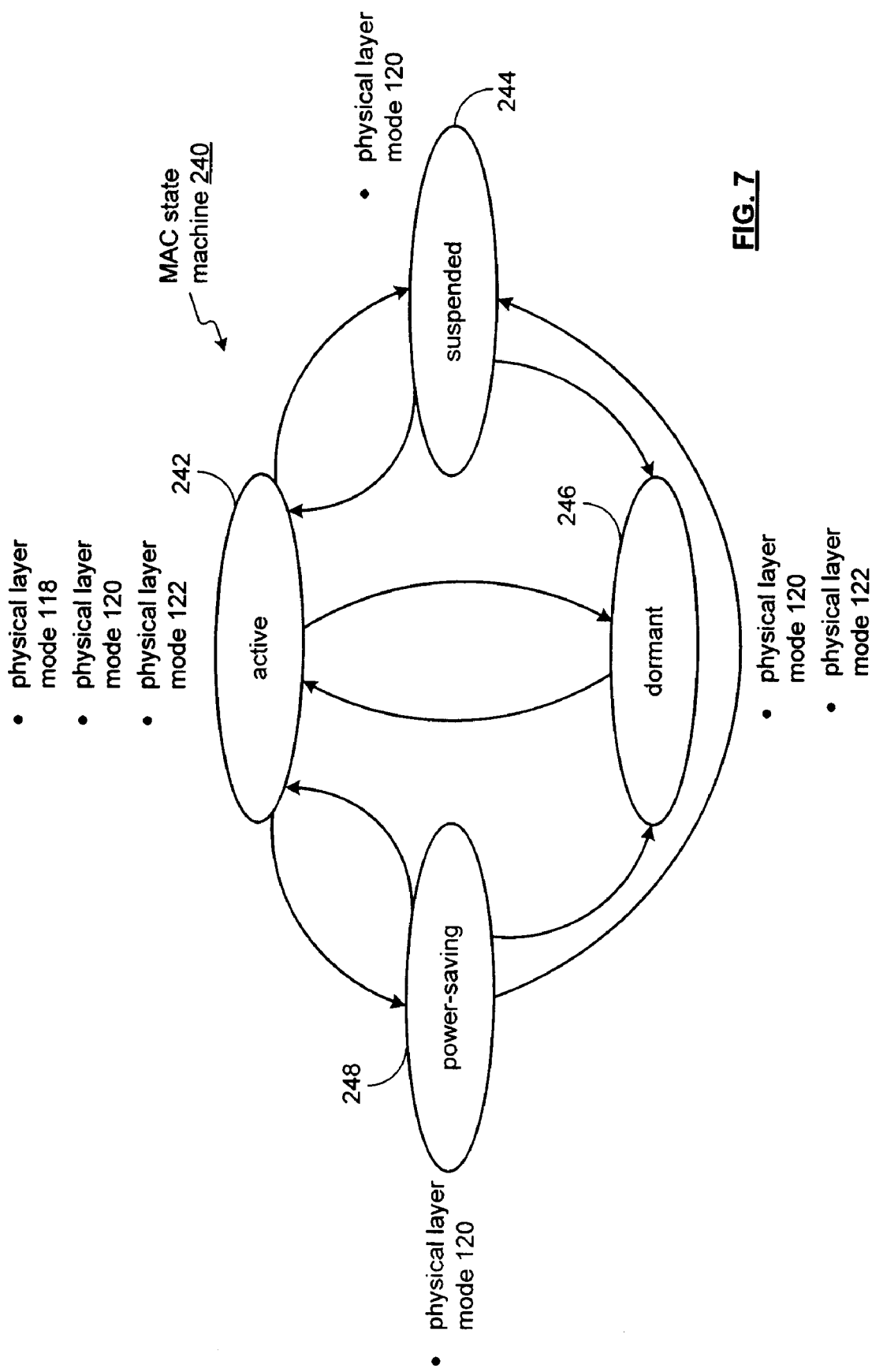
FIG. 7 is an illustration of a MAC state diagram in accordance with an embodiment of the present invention.

FIG. 7 is an illustration of a MAC state diagram 240. The MAC states are used for purposes of power saving and improved resource utilization to support packet data services to mobile terminals. Because of the varying physical layer modes (such as those supporting nomadic services, fixed services, mobile services), different layer modes may have different MAC state requirements (such as those services requiring power saving states versus those that do not). The MAC state diagram includes an active state 242, a dormant state 246, and intermediate states that are the power-saving state 248 and the suspended state 244.

The active state 242 is typically the state where the mobile terminal is readily transmitting and receiving traffic in the forward link and the reverse link, respectively, when instructed by a base station. The mobile terminal is synchronized to the base station in the physical layer in terms of time and frequency, and in layers 2 and 3 in terms of protocol states. The mobile terminal monitors the control signaling from the base station on each time slot. In addition, the mobile terminal and the base station maintain a good estimate of the forward link channel quality of the mobile terminal, while the mobile terminal maintains a good estimate of the required transmit power in the reverse link to achieve the target signal-to-noise ratio (SNR).

A mobile terminal in the active state 242 typically consumes the most power, radio resource and network resource. Accordingly, maintaining a mobile terminal in an active state 242 at all times is not efficient in terms power consumption, radio resource utilization and network resource utilization when supporting packet data applications because packet data traffic is "bursty" in nature. For a large amount of time, the base station may not have data to transmit to the mobile terminal nor the mobile terminal to the base station. As an example, a typical reading time of a web-page is 30 seconds. During this buffer-empty period, the mobile terminal can be put into a state where no transmission and reception activities are required.

The dormant state 246 is the state where the mobile terminal is typically unavailable for forward link data reception and reverse link data transmission. The base station has no knowledge of the forward link channel condition of the mobile terminal, and the mobile terminal does not maintain a good estimate of the required reverse link transmit power and frequency/time transmission offset (for the case of OFDMA systems). The layers 2 and 3 protocol states of the protocol stack 102 may not be retained or synchronized between base station and the mobile terminal. The mobile terminal receiver may turn on periodically (in order of hundreds of milliseconds or seconds) to monitor the paging information from the base station. For the mobile terminal to receive data on the forward link or transmit data on the reverse link, a base station initiated (that is, paging) or mobile terminal initiated call setup procedure typically needs to be performed to transition the mobile terminal from the dormant state 246 to the active state 242.

The intermediate states, that is, the power-saving state 248 and suspended state 244 provide different levels of tradeoff between power/resource consumption and QoS. The power-saving state 248 (also known as a Control-Hold state or Sleep mode) can be viewed as a pseudo-active state. The mobile terminal and the base station may maintain the same physical layer, layer 2 and layer 3 states synchronization as in the active state 242. The difference is that a sleep interval is typically introduced in the power-saving state to allow the mobile terminal to disable its transmitter and receiver during this interval. The sleep intervals may be interlaced with listening intervals, where during listening intervals the mobile terminal operates as in the active state 242. Although the power-saving state 248 consumes less power and radio/network resource than the active state 242, it still consumes a relatively large amount of power and radio/network resource compared to the dormant state 246. An advantage of the power-saving state 248 is the faster transition to the active state 242 (for example, on the order of tens of milliseconds) when there is data to be exchanged between the base station and the mobile terminal.

The suspended state 244 is a state that is similar to the dormant state 246 but provides faster or expedited call setup into the active state 242 (with latency, for example, on the order of hundreds of milliseconds). The difference between the suspended state 244 and the dormant state 246 is that for the suspended state 244, some semi-static layer 2 and layer 3 protocol context information is retained in the mobile terminal and the base station. Accordingly, during call setup, the corresponding signaling handshake between the mobile terminal and the base station to establish or fill in context information that may be omitted. The layer 2/3 protocol context information that may be retained in the suspended state 244 include security context, service flow context, and mobile terminal/base station capability and preferred protocol configurations. In addition, location updates may be performed by the mobile terminal in the suspended state 244 to allow the base station to track the locations of the mobile terminals with respect to a particular cell/sector or paging zone.

The possible state transitions between the various MAC states are shown by the 'arrows' in FIG. 7. In general, each MAC state may not be present and/or supported in a system. A base station can decide which MAC state to transition a mobile terminal to, based on such factors as buffer status, QoS requirements, SLA, radio resource management policy, et cetera.

The MAC state machine 240 operates such that, when a user switches from one physical layer mode to another either within the same or different cell hierarchies, the MAC states and the associated context information of the mobile terminal may be retained. In this way, packet loss and physical layer mode switching/handoff latency can be minimized.

The MAC state machine 240 includes superset of MAC states relevant to the heterogeneous physical layer modes that are present in the multi-mode physical layer 116. For a separate example, physical layer mode 118 supports fixed services. In this regard, only the active state 242 may be applicable because power saving is not an issue for fixed services. The physical layer mode 120 supports mobility services. Accordingly, all four MAC states are applicable. The physical layer mode 122 supports nomadic services. Accordingly, only the active state 242 and the dormant state 246 may be applicable because power consumption is less of an issue for nomadic devices (such as a laptop computer 41 as compared to a handheld type device 54). When a mobile terminal operates in a selected physical layer mode, only a subset of the MAC states and corresponding state transition may be in operation.

Thus, different MAC state transition scenarios when a mobile terminal switches from one physical layer mode to another, depending on the MAC state of the mobile terminal in the previous physical layer mode and the MAC states supported by the new physical layer mode.

Figure 8:
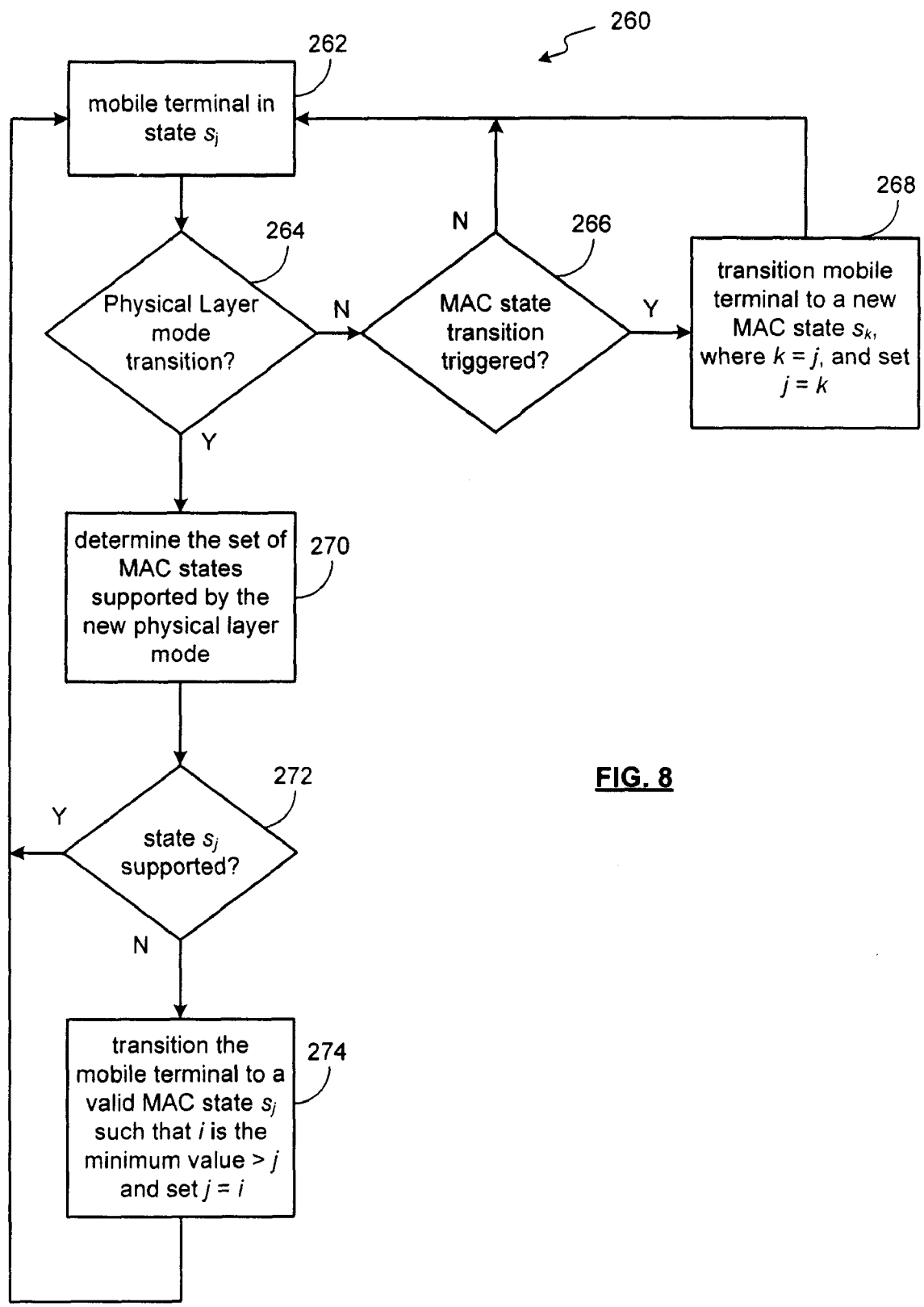
FIG. 8 is a logic diagram illustrating MAC state transitions upon for physical layer mode transitions in accordance with an embodiment of the present invention.

FIG. 8 is a logic diagram 260 illustrating MAC state transitions upon for physical layer mode transitions. At step 262, the set of MAC states S are dormant, suspended, power-saving, and active, where $S_j$ is a member of the set for j equals 0, 1, 2, and 3. When the mobile terminal transitions switches from one PL mode to another, the current MAC state at the previous physical layer mode may be retained if the new physical layer mode supports the same MAC state. Otherwise, the; otherwise, the MS may transition to the next higher MAC state supported by the new PL mode and the allowable state transition flow.

While in the active state 242, a mobile terminal may continuously monitor the signal strength of the surrounding base stations and their associated physical layer modes (from step 262). The physical layer mode transition at step 264 may be initiated by either the base station or the mobile terminal based on the change in signal strength, mobility condition, service needs or system loading.

When at step 264 there is not a physical layer mode transition, the base station determines whether a MAC state transition has occurred at step 266. If not, then the base station returns to step 262. Otherwise, at step 268, the base station transitions the mobile terminal to a new MAC state $S_k$, where k equals j and set j to k.

When at step 264 there is a physical layer mode transition, the base station and/or access gateway determines at step 270 the set of MAC states supported by the new physical layer mode. As an example, when the mobile terminal transitions to other available physical layer modes while in the same state (for example, active state 242), the mobile terminal may remain in that state unless there is insufficient resource in the target physical layer mode to accommodate the mobile terminal. When there are insufficient resources, the mobile terminal may be downgraded (when in an active state) into a lower MAC state supported by the target physical layer mode.

With the set of MAC states determined for the physical layer mode at step 270, the base station determines whether the state of the mobile terminal, state j, is supported by the new physical layer device at step 272. If so, then the state for the mobile terminal is set to the present state. Otherwise, at step 274, the base station transitions the terminal to a valid MAC state, in that the state Sj is changed such that i is the minimum value greater than j and set j=i. The adjustment to a valid MAC state accounts for the situations where the physical layer mode of a mobile terminal is transitioned to a new physical layer mode with a smaller set of valid MAC states (that is, referring briefly back to the example of FIG. 7, where physical layer mode 120 has four valid MAC states, and the physical layer mode 122 has two valid MAC states). With a valid MAC state, the base station returns to state 262 for an a subsequent change to the MAC state and/or the physical layer mode.

In operation, the MAC states provides seamless transitions from a first physical layer mode to another, while avoiding unnecessary call re-establishment overhead and latency that would otherwise be incurred when a mobile terminal moves between heterogeneous systems that lack a common layer 2/3 protocol structure 104.

Figure 9:
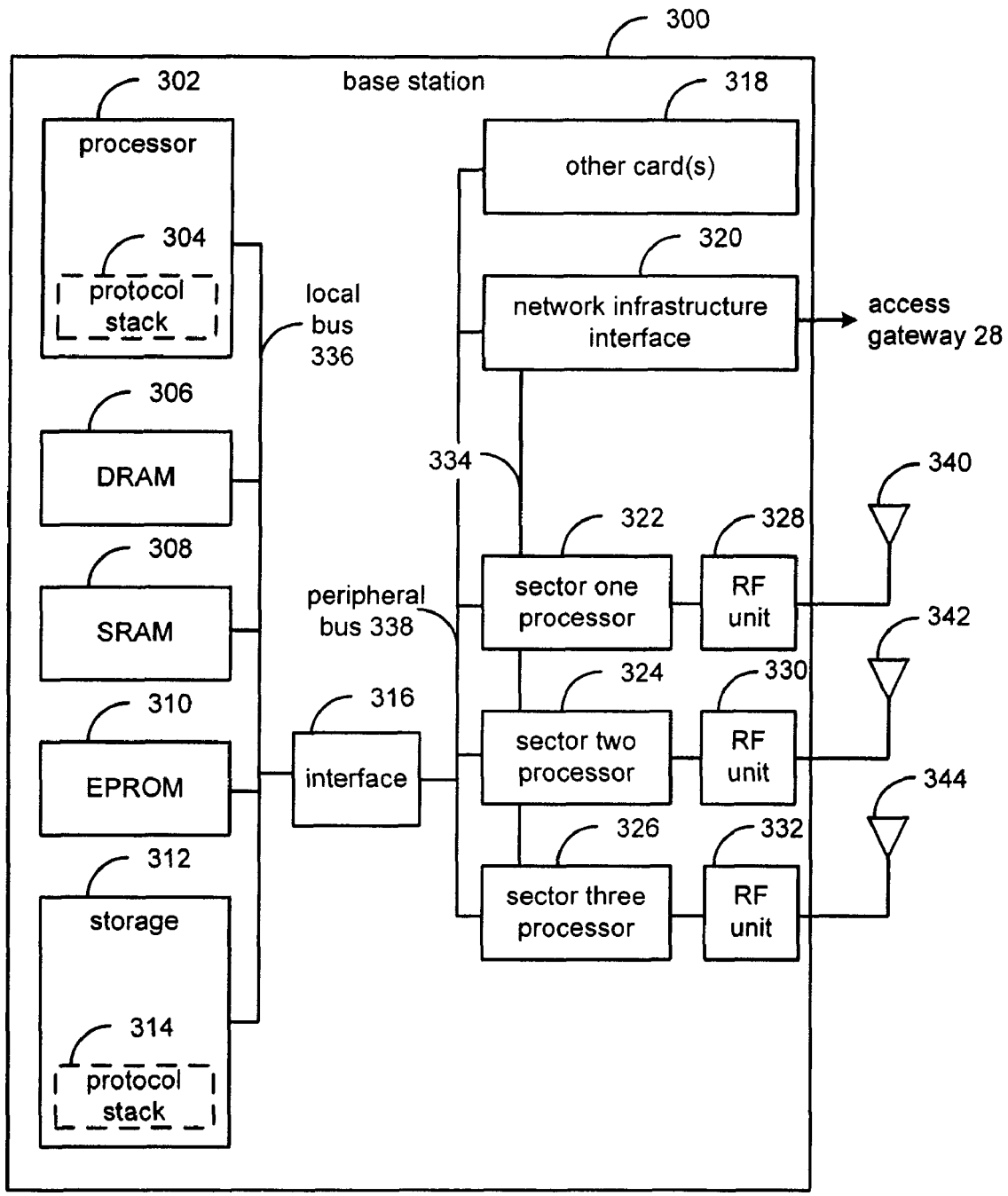
FIG. 9 is a block diagram illustrating a base station constructed according to an embodiment of the invention.

FIG. 9 is a block diagram illustrating a base station 300 constructed according to an embodiment of the invention. The base station 300 supports a plurality of heterogeneous physical layer modes (for example, IS-95A, IS-95B, IS-2000, GSM-EDGE and/or various 3G and 4G standards specifications that are compatible with the teachings herein). The base station 300 supports protocol layer operations such as those described with reference to FIGS. 2 through 4.

The base station 300 includes a processor 302, dynamic RAM 306, static RAM 308, EPROM 310, and at least one data storage device 312, such as a hard drive, optical drive, tape drive, et cetera. These components (which may be contained on a peripheral processing card or module) intercouple via a local bus 336 and couple to a peripheral bus 338 (which may be a back plane) via an interface 316. These peripheral cards couple to the peripheral bus 338. These peripheral cards include a network infrastructure interface card 320, which couples the base station 300 to an access gateway 28 and/or 30.

Digital processing cards 322, 324, and 326 couple to the radio frequency (RF) units 328, 330, and 332, respectively. Each of these digital processing cards 322, 324, and 326 performs digital processing for a respective sector (for example, sector one, sector two, or sector three) serviced by the base station 300. Thus, each of the digital processing cards 322, 324, and 326 will perform some or all of the processing operations described with reference to FIGS. 5 through 8. The RF units 328, 330, and 332 couple to antennas 340, 342, and 344, respectively, and support wireless communication between the base station 300 and the mobile terminals. The base station 300 may include other cards 318 as well.

As noted, the common layer 2/3 protocol functionality may be partitioned between the access gateway and the base stations, but may also reside wholly in a base station. In this regard, the base stations 300 includes a multi-mode physical layer via the RF units and digital processing cards 322, 324, and 326, and a "distributed" common layer 2/3 function, and in this manner supports multiple physical layer modes in the same coverage area 56, 59, 60, and 62 (see FIG. 1). The access gateways 28 and 30 may provide a "centralized" component of the layer 2/3 function, and also serve as a router within the access network 66 and provide interface to the wireless core network infrastructure 24 (as well as public IP networks).

Structures and operational instructions regarding the protocol stack 314 are stored in storage 312. The protocol stack 314 is downloaded to the processor 302 and/or the DRAM 306 as the protocol stack 304 for execution by the processor 302. while the protocol stack is shown to reside within storage 312 contained in the base station 300, the protocol stack may be loaded onto portable media such as magnetic media, optical media, or electronic media. Further, the protocol stack 314 structure and/or operational instructions may be electronically transmitted from one computer to another across a data communication path.

Upon execution of the operational instructions and structures regarding the protocol stack 304, the base station 300 performs operations according to the methods and processes described herein with reference to FIGS. 1 through 10. The protocol stack 304 structure and/or operational instructions may be partially executed by the digital processing cards 322, 324, and 326 and/or other components of the base station 300. Further, the structure of the base station 300 illustrated is only one of may varied base station structures that could be operated according to the descriptions contained herein.

Figure 10:
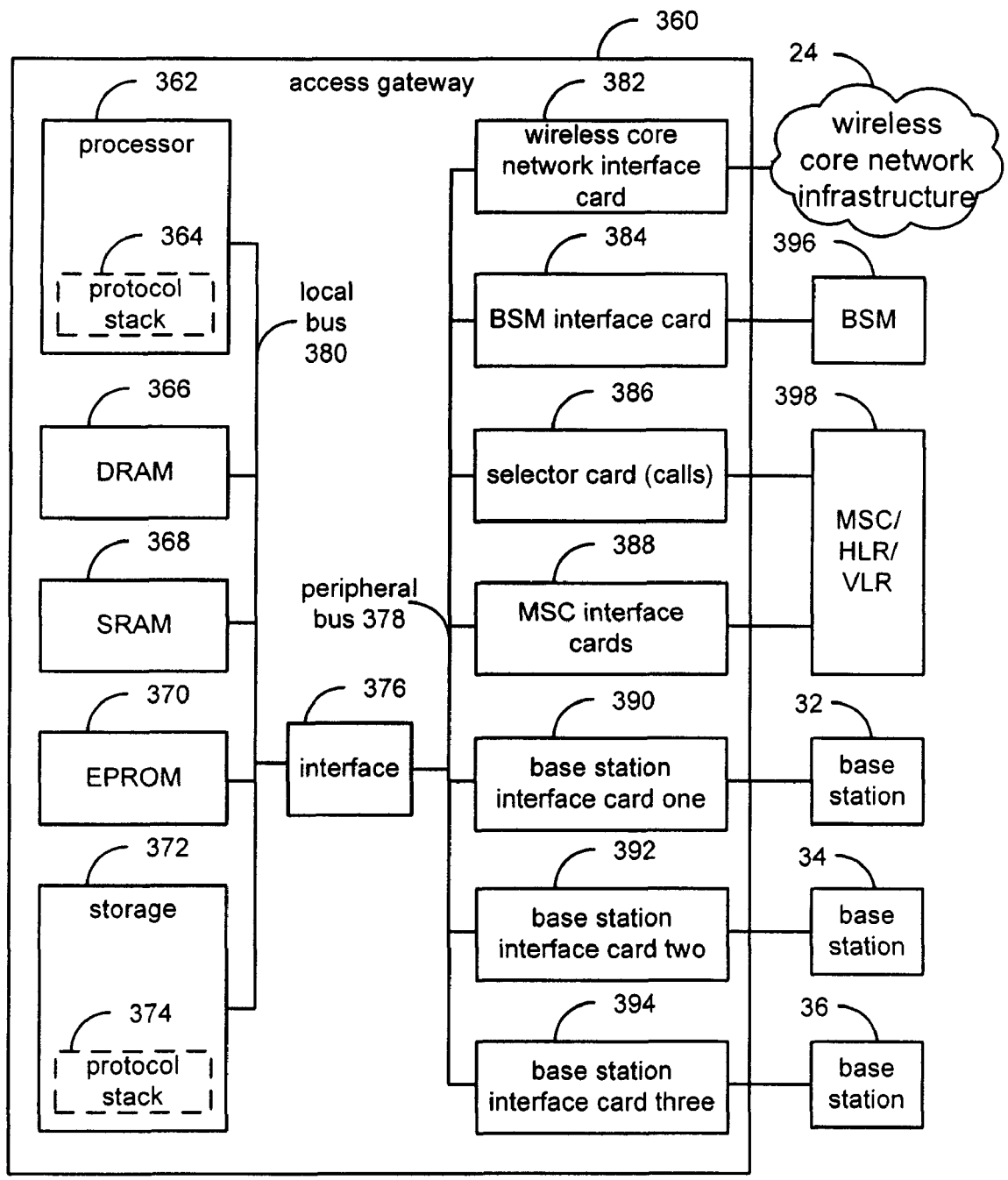
FIG. 10 is a block diagram illustrating an access gateway constructed according to an embodiment of the invention.

FIG. 10 is a block diagram illustrating an access gateway, which may also be referred to as a Base Station Controller, constructed according to an embodiment of the present invention. The structure and operation of an access gateway is generally understood. The access gateway 360 may service both circuit switched and packet switched operations, and in some cases is called upon to convert data between circuit switched and data switched formats, depending upon the types of equipment coupled to the access gateway 360. The components illustrated in FIG. 10, their function, and the interconnectivity may vary without departing from the teachings of the present invention.

The access gateway includes a processor 362, dynamic RAM 366, static RAM 368, EPROM 370 and at least one data storage device 372, such as a hard drive, optical drive, tape drive, et cetera. These components intercouple via a local bus 380 and couple to a peripheral bus 378 via an interface 376. Various peripheral cards couple to the peripheral bus 378. These peripheral cards include a wireless core network interface card 382, a base station manager (BSM) interface card 384, at least one selector card 386, a mobile station controller (MSC) interface card 388, and a plurality of base station interface cards 390, 392, and 394.

The wireless core network interface card couples the access gateway 360 to a wireless core network infrastructure 24. The base station manager interface card 384 couples the access gateway 360 to a Base Station Manager 396. The selector card 386 and MSC interface card 388 couple the access gateway 360 to the MSC/HLR/VLR 398. The base station interface cards 390, 392, and 394 couple the access gateway 360 to the base stations 32, 34, and 36, respectively.

Structures and operational instructions regarding the protocol stack 374 are stored in storage 372. The protocol stack 374 is downloaded to the processor 362 and/or the DRAM 366 as the protocol stack 364 for execution by the processor 362. While the protocol stack is shown to reside within storage 372 contained in the access gateway 360, the protocol stack may be loaded onto portable media such as magnetic media, optical media, or electronic media. Further, the protocol stack 274 structure and/or operational instructions may be electronically transmitted from one computer to another across a data communication path.

The protocol stack 364 may be implemented as a centralized layer 2/3 protocol structure 106 (see FIG. 2) to complement the distributed layer 2/3 protocol structure 108 within each of the base stations 32, 34, and 36. In operation, the access gateway 360 stores a centralized layer 2/3 context of each mobile terminal coupled to the access network formed by the access gateway 360 and the base stations 32, 34, and 36 to eliminate a need for context transfer for intra-base station handoffs between the base stations 32, 34, and 36.

The embodiments of the invention disclosed herein are susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for dynamic traffic load balancing with a plurality of heterogeneous physical layer modes of an air interface protocol architecture, the architecture supports a plurality of physical layer mode multiplexing scenarios for scheduling communication data over a plurality of time slots for use in a multi-carrier wireless communications network having a plurality of carriers, the method comprises:

for each time slot of the plurality of time slots:
assigning priorities to each of a plurality of mobile terminals based upon a scheduling priority criteria, wherein each of the plurality of mobile terminals include at least one physical layer mode;
sorting the plurality of mobile terminals in order of the assigned priority for data communication;
when the physical layer mode multiplexing scenario is a Time Division Multiplexing (TDM) scenario,
selecting the physical layer mode based upon the mobile terminal of the plurality of mobile terminals having the highest assigned priority for data communication and the physical layer mode that the highest assigned priority mobile terminal supports; and
when the time slot can accommodate an additional mobile terminal of the plurality of mobile terminals, selecting a next highest assigned priority mobile terminal for data communication that supports the selected physical layer mode until the time slot cannot accommodate further additional mobile terminals or no further additional mobile terminals remain that support the selected physical layer mode; and
when the physical layer mode multiplexing scenario is a Frequency Division Multiplexing (FDM) scenario, selecting the physical layer mode based upon the highest assigned priority mobile terminal for data communication and whether the highest assigned priority mobile terminal is a single physical-layer mode mobile terminal or a multi physical-layer mode mobile terminal; and when the physical layer resources can accommodate an additional mobile terminal of the plurality of mobile terminals, selecting a next highest assigned priority terminal for data communication until the physical layer resources cannot accommodate a further additional mobile terminal of the plurality of mobile terminals or none of the mobile terminals of the plurality of mobile terminals remain.

2. The method of claim 1 wherein when the physical layer mode multiplexing scenario is a FDM scenario and the highest assigned priority mobile terminal for data communication is a physical layer multi-mode terminal; and when the physical layer multi-mode mobile terminal is not capable of data communications with each of a plurality of physical layer modes of interest, the selected physical layer mode is a least loaded physical layer mode.

3. The method of claim 1 wherein when the physical layer mode multiplexing scenario is a FDM scenario and the highest assigned priority mobile terminal for data communication is a physical layer multi-mode terminal; and when the physical layer multi-mode mobile terminal is capable of data communications with each of a plurality of physical layer modes of interest, the selected physical layer mode is the physical layer mode that occupies a least amount of spectrum resources.

4. The method claim 1 further comprises:
when the selected physical layer mode changes to a subsequent selected physical layer mode, determining a set of MAC states supported by the subsequent physical layer mode; and when a present MAC state of the mobile terminal is not supported, transitioning the mobile terminal to a valid MAC state of the set of MAC states for the subsequent physical layer mode.

5. The method of claim 1 wherein the heterogeneous physical layer modes relate to different access protocols, the access protocols include CDMA, OFDM, MC-CDMA, TDMA, FDMA or Single Carrier access protocols.

6. A base station that operates to receive data from a mobile terminal across a wireless link of a multi-carrier wireless communication system comprises:
an antenna;
a radio frequency unit coupled to the antenna that operates to support wireless communication between the base station and the mobile terminal; and
at least one digital processor communicatively coupled to the radio frequency unit and operable to cause the base station to support dynamic traffic load balancing with a plurality of heterogeneous physical layer modes of an air interface protocol architecture of the base station, the architecture supports a plurality of physical layer mode multiplexing scenarios for scheduling communication data over a plurality of time slots for use in the multi-carrier wireless communications network by:
for each time slot of the plurality of time slots:
assign priorities to each of a plurality of mobile terminals based upon a scheduling priority criteria, wherein each of the plurality of mobile terminals include at least one physical layer mode;

sort the plurality of mobile terminals in order of the assigned priority for data communication;
when the physical layer mode multiplexing scenario is a Time Division Multiplexing (TDM) scenario,
select the physical layer mode based upon the mobile terminal of the plurality of mobile terminals having the highest assigned priority for data communication and the physical layer mode that the highest assigned priority mobile terminal supports; and
when the time slot can accommodate an additional mobile terminal of the plurality of mobile terminals, select a next highest assigned priority mobile terminal for data communication that supports the selected physical layer mode until the time slot cannot accommodate a further additional mobile terminal or none of the mobile terminals remain that support the selected physical layer mode; and
when the physical layer mode multiplexing scenario is a Frequency Division Multiplexing (FDM) scenario,
select the physical layer mode based upon the highest assigned priority mobile terminal for data communication and whether the highest assigned priority mobile terminal is a single physical-layer mode mobile terminal or a multi physical-layer mode mobile terminal; and
when physical layer resources can accommodate an additional mobile terminal, select a next highest assigned priority terminal for data communication until the physical layer resources cannot accommodate the further additional mobile terminal of the plurality of mobile terminals or none of the mobile terminals of the plurality of mobile terminals remain.

7. The base station of claim 6 wherein when the physical layer mode multiplexing scenario is a FDM scenario and the highest assigned priority mobile terminal for data communication is a physical layer multi-mode terminal; and when the physical layer multi-mode mobile terminal is not capable of data communications with each of a plurality of physical layer modes of interest, the selected physical layer mode is a least loaded physical layer mode.

8. The base station of claim 6 wherein when the physical layer mode multiplexing scenario is a FDM scenario and the highest assigned priority mobile terminal for data communication is a physical layer multi-mode terminal; and when the physical layer multi-mode mobile terminal is capable of data communications with each of a plurality of physical layer modes of interest, the selected physical layer mode is the physical layer mode that occupies a least amount of spectrum resources.

9. The base station of claim 6 further comprises:
when the selected physical layer mode changes to a subsequent selected physical layer mode, determine a set of MAC states supported by the subsequent physical layer mode; and
when a present MAC state of the mobile terminal is not supported, transition the mobile terminal to a valid MAC state of the set of MAC states for the subsequent physical layer mode.

10. The base station of claim 6 wherein the heterogeneous physical layer modes relate to different access protocols, the access protocols include CDMA, OFDM, MC-CDMA, TDMA, FDMA or Single Carrier access protocols.

* * * * *